(12) United States Patent
Buissette et al.

(10) Patent No.: US 8,580,150 B2
(45) Date of Patent: Nov. 12, 2013

(54) SUBMICRONIC BARIUM AND MAGNESIUM ALUMINATE PHOSPHORS

(75) Inventors: Valérie Buissette, Paris (FR); Thierry Le-Mercier, Rosny-sous-Bois (FR); Laurent Thiers, Savigny-sur-Orge (FR); Yvan Montardi, Cormeilles-en-Parisis (FR); Olivier Le-Roux, Rosny-sous-Bois (FR)

(73) Assignee: Rhodia Operations, Aubervilliers (FR)

( * ) Notice: Subject to any disclaimer, the term of this patent is extended or adjusted under 35 U.S.C. 154(b) by 355 days.

(21) Appl. No.: 12/933,133

(22) PCT Filed: Mar. 10, 2009

(86) PCT No.: PCT/EP2009/052795
§ 371 (c)(1),
(2), (4) Date: Feb. 8, 2010

(87) PCT Pub. No.: WO2009/115435
PCT Pub. Date: Sep. 24, 2009

(65) Prior Publication Data
US 2011/0068303 A1 Mar. 24, 2011

(30) Foreign Application Priority Data

Mar. 18, 2008 (FR) ...................................... 08 01468

(51) Int. Cl.
*C09K 11/77* (2006.01)
(52) U.S. Cl.
USPC .................................... 252/301.4 R; 977/811
(58) Field of Classification Search
USPC ..................... 252/301.4 R; 977/811; 313/486
See application file for complete search history.

(56) References Cited

U.S. PATENT DOCUMENTS

| 5,611,959 A * | 3/1997 | Kijima et al. ........... 252/301.4 R |
| 6,197,218 B1 * | 3/2001 | Hampden-Smith et al. ...................... 252/301.4 R |
| 2002/0089284 A1 * | 7/2002 | Hayashi ........................ 313/582 |
| 2003/0203205 A1 | 10/2003 | Bi et al. |

FOREIGN PATENT DOCUMENTS

JP 2007 246873 A 9/2007

OTHER PUBLICATIONS

Panatarani et al, "Polymer-supported solution synthesis of blue luminescent BaMgAl10O17:Eu 2+ particles", Material Science and Engineering B, 122, 2005, pp. 188-195.*
Watanabe et al., "Synthesis of Blue Phosphor, $BaMgAl_{10}O_{17}:Eu^{2+}$, from the Flash Creation Method Derived Nanopowder", ITE Letters on Batteries, New Technologies & Medicine, 2007, pp. 38-41, vol. 8, No. 1.
Panatarani et al., "Polymer-supported solution synthesis of blue luminescent $BaMgAl_{10}O_{17}:Eu^{2+}$ particles", Materials Science & Engineering B, 2005, pp. 188-195, vol. 122.
Okuyama et al., "Preparation of nanoparticles via spray route", Chemical Engineering Science, 2003, pp. 537-547, vol. 58.

* cited by examiner

*Primary Examiner* — Carol M Koslow
(74) *Attorney, Agent, or Firm* — Dentons US LLP

(57) ABSTRACT

Submicronic barium and magnesium aluminates, useful as phosphors, are in the form of a liquid-phase suspension of substantially monocrystalline particles having an average particle size ranging from 80 to 400 nm; such aluminates are prepared by a process that includes: providing a liquid mixture containing compounds of aluminum and of other elements that are part of the aluminate composition; drying the mixture by atomization; calcining the dried product in a reducing atmosphere and wet-grinding this product.

14 Claims, 3 Drawing Sheets

SUBMICRONIC BARIUM AND MAGNESIUM ALUMINATE PHOSPHORS

CROSS-REFERENCE TO PRIORITY/PCT APPLICATIONS

This application is a National Stage of PCT/EP 2009/052795, filed Mar. 10, 2009 and designating the United States (published in the French language on Sep. 24, 2009, as WO 2009/115435 A1; the title and abstract were published in English), which claims priority of FR 0801468, filed Mar. 18, 2008, each hereby expressly incorporated by reference in its entirety and each assigned to the assignee hereof.

The present invention relates to a submicron barium magnesium aluminate, to a process for producing it and to the use of this aluminate as a phosphor.

The luminescence and electronics fields are currently experiencing considerable developments. Examples of these developments that may be mentioned include the development of plasma systems (displays and lamps) for new techniques in displays, lighting or marking. These new applications require phosphor materials having further improved properties. Thus, apart from their luminescence property, specific morphology or particle size characteristics are required of these materials so as in particular to facilitate their implementation in the required applications.

More precisely, there is a demand to have phosphors in the form of particles that are divided as far as possible and have a very small, submicron, size, especially smaller than 500 nm. Processes for producing phosphors by grogging are known. However, to obtain the desired crystallographic phases, these processes require calcination at a high temperature. Consequently, this generally results in products that are difficult to grind so that it is impossible to achieve such a small size.

Moreover, and again in the context of development in the luminescence and electronics fields, it is sought to obtain materials in the form of thin, transparent and luminescent films.

The main object of the invention is to provide products having such particle size characteristics.

The second object of the invention is to obtain a luminescent material of the above type.

For this purpose, the barium magnesium aluminate of the invention is characterized in that it is in the form of a suspension of substantially single-crystal particles with a mean size between 80 and 400 nm in a liquid phase.

Other features, details and advantages of the invention will become even more fully apparent on reading the following description, in conjunction with the appended drawings in which.

Figure 1:
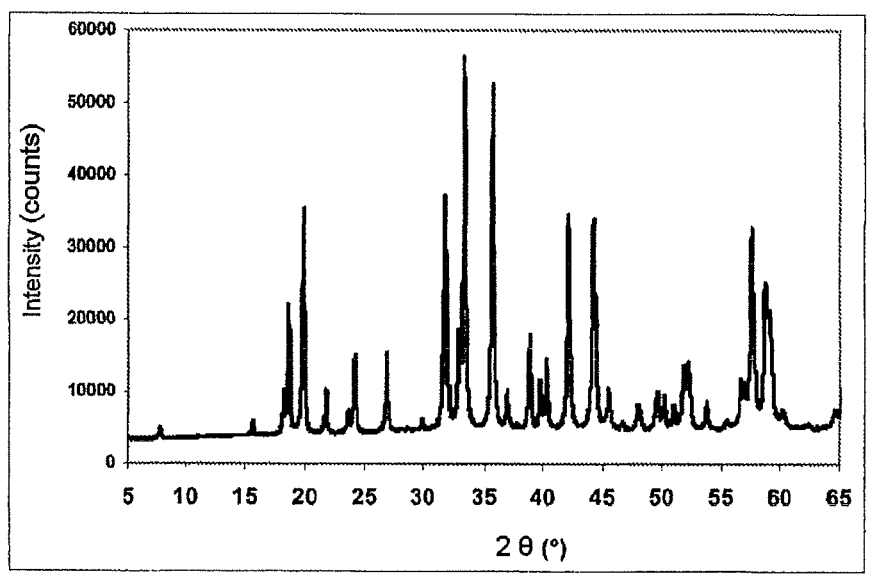
FIG. 1 is an XRD pattern of an aluminate according to the invention.

The term "rare earth" is understood in the present description to mean elements of the group formed by yttrium and the elements of the Periodic Table with atomic numbers between 57 and 71 inclusive.

The aluminate of the invention consists of particles, the essential feature of which is that they are submicron single-crystal particles.

More precisely, these particles have a mean size ($d_{50}$) of between 80 and 400 nm, more particularly between 100 and 300 nm. This size may be between 80 and 200 nm and even more particularly between 100 and 200 nm. For some applications of the aluminate of the invention, for example for the manufacture of a transparent material, as will be described later, it is possible to use an aluminate comprising particles with a size of between 100 and 150 nm.

Moreover, these particles may have a narrow particle size distribution, more precisely their distribution index may be at most 1, preferably at most 0.7 and even more preferably at most 0.5.

Throughout the description, the mean size and the distribution index are the values obtained by implementing the laser scattering technique using a laser particle size analyzer (volume distribution).

The term "distribution index" is understood to mean the ratio:

$$\sigma/m = (d_{84} - d_{16})/2d_{50}$$

in which:
  $d_{84}$ is the diameter of the particles for which 84% of the particles have a diameter of less than $d_{84}$;
  $d_{16}$ is the diameter of the particles for which 16% of the particles have a diameter of less than $d_{16}$; and
  $d_{50}$ is the mean diameter of the particles.

It is specified here that the mean size measurements are performed on suspensions that have not suffered any settling, that is to say with no supernatant and no settled phase, and which, if necessary, have been treated ultrasonically using well-known methods for measurements of this type.

The other feature of the constituent particles of the aluminate of the invention is their single-crystal character. This is because most of these particles, that is to say at least about 90% of them, and preferably all of them, consist of a single crystal.

This single-crystal aspect of the particles may be demonstrated in the technique of transmission electron microscopy (TEM) analysis.

For suspensions in which the particles are in a size range of at most about 200 nm, the single-crystal aspect of the particles may also be demonstrated by comparing the mean particle size measured by the abovementioned laser scattering technique with the measurement of the size of the crystal or the coherent domain obtained from X-ray diffraction (XRD) analysis. It should be pointed out here that the XRD measured value corresponds to the size of the coherent domain calculated from the diffraction line corresponding to the [102] crystallographic plane. The two values, namely the laser scattering mean size and the XRD mean size, are of the same order of magnitude, that is to say they are in a ($d_{50}$ measurement value/XRD measurement value) ratio of less than 2, more particularly at most 1.5.

As a consequence of their single-crystal character, the aluminate particles of the invention are in a well-separated and finely divided form. There are little or no particle agglomerates. This finely divided character of the particles may be demonstrated by comparing the $d_{50}$ measured by the laser scattering technique with that measured using an image obtained by transmission electron microscopy (TEM). Thus, for a given value of $d_{50}$ measured by the laser scattering technique (laser $d_{50}$ value), the value measured by TEM (TEM value) is at least equal to (laser $d_{50}$ value)/2 and the (laser $d_{50}$ value/TEM value) ratio may be between 1 and 2.

The aluminate of the invention is based on aluminum, barium and magnesium in oxide form, but it may contain additional elements, called "substituents" or "dopants", since these elements are considered as partially substituting the constituent elements Ba, Mg and Al and make it possible in particular to modify the optical and luminescent properties of the aluminate.

Given below are examples of these substituents for each constituent element on the basis of what is commonly accepted at the present time in the prior art. This implies that it would not be outside the scope of the present invention if a substituent described for a given constituent element were in fact to prove subsequently to substitute for a constituent element other than that presumed in the present description.

Thus, the barium may be partially substituted with at least one rare earth that may especially be gadolinium, terbium, yttrium, ytterbium, europium, neodymium and dysprosium, these elements possibly being taken individually or in combination. Likewise, the magnesium may be partially substituted with at least one element chosen from zinc, manganese and cobalt. Finally, the aluminum may also be partially substituted with at least one element chosen from gallium, scandium, boron, germanium and silicon.

As is known, the amounts of these substituents may vary widely, however they must be such that, as regards the maximum values, the crystallographic structure of the aluminate is substantially preserved. Moreover, the minimum amount of substituent is that below which the substituent produces no effect.

Generally however, the amount of substituent for barium is at most 40%, more particularly at most 20% and even more particularly at most 10%, this amount being expressed in at % (substituent/(substituent+Ba) atomic ratio). For magnesium, this amount (expressed in the same way) is generally at most 60%, more particularly at most 40% and even more particularly at most 10%. For aluminum, this amount, again expressed in the same way, is generally at most 15%. The minimum amount of substituent may for example be at least 0.1%.

To give an example, the aluminate of the invention may satisfy formula (I) below:

$$a(Ba_{1-d}M^1_dO).b(Mg_{1-e}M^2_eO).c(Al_2O_3) \quad (I)$$

in which:
  $M^1$ denotes a rare earth, which may more particularly be gadolinium, terbium, yttrium, ytterbium, europium, neodymium or dysprosium;
  $M^2$ denotes zinc, manganese or cobalt;
  a, b, c, d and e satisfy the relationships:
  $0.25 \leq a \leq 2$; $0 < b \leq 2$; $3 \leq c \leq 9$; $0 \leq d \leq 0.4$ and $0 \leq e \leq 0.6$.
  $M^1$ may be more particularly europium.
  $M^2$ may more particularly be manganese.

More particularly, the aluminate of the invention may satisfy formula (I) above in which $a=b=1$ and $c=5$.

According to another particular embodiment, the aluminate of the invention may satisfy formula (I) above in which $a=b=1$ and $c=7$.

According to yet another particular embodiment, the aluminate of the invention may satisfy formula (I) above in which $a=1$; $b=2$ and $c=8$.

Thus, examples of this type of product that may be mentioned include those of formulae: $BaMgAl_{10}O_{17}$; $Ba_{0.9}Eu_{0.1}MgAl_{10}O_{17}$; $Ba_{0.9}Eu_{0.1}Mg_{0.6}Mn_{0.4}Al_{10}O_{17}$; $Ba_{0.9}Eu_{0.1}Mg_{0.8}Mn_{0.2}Al_{10}O_{17}$; $Ba_{0.9}Eu_{0.1}Mg_{0.95}Mn_{0.05}Al_{10}O_{17}$; $BaMgAl_{14}O_{23}$; $Ba_{0.9}Eu_{0.1}MgAl_{14}O_{23}$; $Ba_{0.8}Eu_{0.2}Mg_{1.93}Mn_{0.07}Al_{16}O_{27}$.

The aluminate of the invention is generally in the form of a suspension of the particles described above in a liquid phase.

As regards solid particles, these consist essentially or only of the aluminate as described above—they do not contain compounds other than this aluminate, with the exception, for example, of possible impurities in a very small amount. The aluminate is crystallized essentially in the form of a β-alumina. This crystallization is demonstrated by XRD analysis. The term "essentially" is understood to mean that the XRD pattern obtained by the analysis carried out on the dried powder obtained from the suspension of the invention may have, apart from the predominant β-alumina phase, one or more minor phases corresponding to impurities such as, for example, $BaAl_2O_4$. According to a preferred embodiment of the invention, the aluminate is crystallized in the form of a pure β-alumina phase. In this case, the XRD analysis reveals only a single crystallographic phase.

This suspension is stable, which is understood to mean that no sedimentation of the solid particles is observed over several hours, for example over a period of about 24 hours.

However, some sedimentation may be observed over the course of time, which may result in the particles agglomerating. However, and this is an important property of the suspension of the invention, simple agitation using very low mechanical energy, especially an ultrasonic treatment, for example with a power of 120 W for three minutes, serves to deagglomerate these particles and therefore to recover the suspension, the particles of which have all the above-mentioned characteristics.

The liquid phase of the suspensions according to the invention may be water or a water-miscible water/solvent mixture or else an organic solvent.

The organic solvent may most particularly be a water-miscible solvent. Examples that may be mentioned include: alcohols, such as methanol or ethanol; glycols, such as ethylene glycol; acetate derivatives of glycols, such as ethylene glycol monoacetate; ethers of glycols; polyols and ketones.

This liquid phase may also include a dispersant.

This dispersant may be chosen from known dispersants, for example from alkali metal polyphosphates ($M_{n+2}P_nO_{3n+1}$) or metaphosphates ($[MPO_3]_n$) (M denoting an alkali metal such as sodium), especially such as sodium hexametaphosphate. It may also be chosen from alkali metal silicates (sodium silicate), amino alcohols, phosphonates, citric acid and its salts, derivatives of phosphosuccinic acid (($HOOC)_n$—R—$PO_3H_2$, where R is an alkyl chain), polyacrylic, polymethacrylic, polystyrene sulfonic acids and salts thereof. Citric acid and metaphosphates are most particularly preferred.

The amount of dispersant may be between 1% and 15%, more particularly between 4% and 8%, this amount being expressed by weight of dispersant relative to the weight of solids in the dispersion.

The concentration of the suspension may vary widely. To give an example, it may be between about 10 g/l and about 500 g/l, more particularly between 40 g/l and 300 g/l, this concentration being expressed by weight of solid per volume of suspension.

For suspensions in an aqueous phase, and according to a particular embodiment, one advantageous feature of the suspensions is their stability over a wide pH range. Thus, these suspensions remain stable, that is to say they give rise to no particle sedimentation and agglomeration when their pH is caused to vary between given ranges of values, these ranges together covering overall pH values that may be between 2 and 11, more particularly between 4 and 10. Such pH variations may occur when processing the suspensions in luminescence applications, and this feature is therefore important since suspensions may thus be used in a wide range of applications.

The invention also relates to an aluminate which is in solid form, that is to say a powder, having the feature of being able to give the aluminate in suspension form described above. In other words, when this powder is redispersed in a liquid phase, after simple agitation, without it being necessary to apply a large amount of mechanical energy, especially, here again, by a simple ultrasonic treatment, for example with a power of about 450 W, a suspension of the aluminate with the features given above is obtained.

The process for producing the aluminate of the invention in suspension form will now be described.

This process includes a first step in which a liquid mixture is formed, this being a solution or a suspension or even a gel of the aluminum compounds and compounds of other elements in the composition of the aluminate.

As compounds of these elements, it is common practice to use inorganic salts or hydroxides or carbonates. As salts, preferably nitrates may be mentioned, especially in the case of barium, aluminum, europium and magnesium. Sulfates, especially in the case of aluminum, chlorides or else organic salts, for example acetates, may optionally be employed.

It is also possible to use, as aluminum compound, a colloidal dispersion or sol of aluminum. Such a colloidal aluminum dispersion may have particles or colloids whose size lies between 1 nm and 300 nm. The aluminum may be present in the sol in boehmite form.

The next step consists in drying the mixture prepared beforehand. This drying is performed by spraying.

The expression "spray drying" is understood to mean drying by spraying the mixture into a hot atmosphere. The spraying may be performed by means of any sprayer known per se, for example a spray nozzle of the sprinkler-rose type or another type. It is also possible to use atomizers called turbine atomizers. With regard to the various spraying techniques that can be used in the present method, reference may especially be made to the fundamental work by Masters entitled "*Spray drying*" (second edition, 1976, published by George Godwin, London).

It should be noted that it is also possible to employ the spray-drying operation by means of a "flash" reactor, for example of the type described in French Patent Applications Nos 2 257 326, 2 419 754 and 2 431 321. This type of spray dryer may be used in particular to prepare products of small particle size. In this case, the treating gases (hot gases) are given a helical motion and flow into a vortex well. The mixture to be dried is injected along a path coincident with the axis of symmetry of the helical paths of said gases, thereby allowing the momentum of the gases to be completely transferred to the mixture to be treated. In fact, the gases thus fulfill two functions: firstly, the function of spraying the initial mixture, that is to say converting it into fine droplets, and secondly, the function of drying the droplets obtained. Moreover, the extremely short residence time (generally less than about 1/10th of a second) of the particles in the reactor has the advantage, among others, of limiting any risk of them being overheated as a result of being in contact with the hot gases for too long a time.

With regard to the flash reactor mentioned above, reference may especially be made to FIG. 1 of French Patent Application 2 431 321.

This consists of a combustion chamber and a contact chamber composed of a double cone or a truncated cone whose upper part diverges. The combustion chamber runs into the contact chamber via a narrow passage.

The upper part of the combustion chamber is provided with an opening allowing the combustible phase to be introduced.

Moreover, the combustion chamber includes a coaxial internal cylinder, thus defining, inside the combustion chamber, a central region and an annular peripheral region, having perforations located mostly toward the upper part of the apparatus. The chamber has a minimum of six perforations distributed over at least one circle, but preferably over several circles which are spaced apart axially. The total surface area of the perforations located in the lower part of the chamber may be very small, of the order of 1/10th to 1/100th of the total surface area of the perforations of said coaxial internal cylinder.

The perforations are usually circular and of very small thickness. Preferably, the ratio of the perforation diameter to the wall thickness is at least 5, the minimum wall thickness being only limited by the mechanical requirements.

Finally, an angled pipe runs into the narrow passage, the end of which opens along the axis of the central region.

The gas phase undergoing a helical motion (hereinafter called the helical phase) consists of a gas, generally air, introduced into an orifice made in the annular region, this orifice preferably being located in the lower part of said region.

To obtain a helical phase in the narrow passage, the gas phase is preferably introduced at low pressure into the aforementioned orifice, that is to say at a pressure of less than 1 bar and more particularly at a pressure of between 0.2 and 0.5 bar above the pressure existing in the contact chamber. The velocity of this helical phase is generally between 10 and 100 m/s and preferably between 30 and 60 m/s.

Moreover, a combustible phase, which may especially be methane, is injected axially via the aforementioned opening into the central region at a velocity of about 100 to 150 m/s.

The combustible phase is ignited, by any known means, in that region where the fuel and the helical phase come into contact with each other.

Thereafter, the flow imposed on the gases in the narrow passage takes place along a number of paths coincident with families of generatrices of a hyperboloid. These generatrices are based on a family of small-sized circles or rings located close to and below the narrow passage, before diverging in all directions.

Next, the mixture to be treated in liquid form is introduced via the aforementioned pipe. The liquid is then divided into a multitude of drops, each drop being transported by a volume of gas and subjected to a motion creating a centrifugal effect. Usually, the flow rate of the liquid is between 0.03 and 10 m/s.

The ratio of the proper momentum of the helical phase to that of the liquid mixture must be high. In particular, it is at least 100 and preferably between 1000 and 10 000. The momenta in the narrow passage are calculated based on the input flow rates of the gas and of the mixture to be treated, and on the cross section of said passage. Increasing the flow rates increases the size of the drops.

Under these conditions, the proper motion of the gases is imposed, both in its direction and its intensity, on the drops of the mixture to be treated, these being separated from one another in the region of convergence of the two streams. The velocity of the liquid mixture is, in addition, reduced to the minimum needed to obtain a continuous flow.

The spray-drying is generally carried out with a solid output temperature of between 100° C. and 300° C.

The next step of the process consists in calcining the product obtained after the drying operation.

This calcination is carried out at a temperature which is high enough to obtain a crystalline phase. In general, this temperature is at least 1100° C., more particularly at least 1200° C. It may be at most 1500° C. and for example be between 1200° C. and 1400° C.

This calcination is carried out in air or, especially in the case when the aluminate contains a dopant and for uses of this aluminate as a phosphor, in a reducing atmosphere, for example in a hydrogen/nitrogen or hydrogen/argon mixture. The duration of this calcination is for example between about 30 minutes and 10 hours. It is possible to carry out two calcinations, the first in air and the second in a reducing atmosphere.

In certain cases, depending on the type of starting compounds chosen from aluminum and other elements, it may be advantageous to carry out a calcination prior to that or those mentioned above, at a somewhat lower temperature than the temperatures given above, for example below 1000° C.

The final step of the process consists in grinding the product obtained from the calcination. According to the invention, the product undergoes wet grinding in water or else in a water/solvent mixture or in an organic solvent of the same type as the solvents described above as regards the constituent liquid phase of the suspension.

During the grinding, a dispersant of the type of those described above, and in the amounts given above, may be used. This dispersant may help to stabilize the suspension obtained in various pH ranges as described above, a given dispersant inducing stability within a given pH range.

The wet grinding is carried out under conditions that moreover are well known to those skilled in the art.

After the wet grinding, the aluminate of the invention in suspension form is obtained.

It should be noted that in the case of a suspension in a water/solvent mixture or in an organic solvent, this suspension may be produced from an aqueous suspension as obtained by the process described above and by addition of the organic solvent to this aqueous suspension and then, if necessary, distillation to remove the water.

The above description relates to the production of the aluminate in the form of a suspension. To obtain the aluminate of the invention in the form of a powder, the process starts with this suspension and then the solid product is separated from the liquid phase using any known separation technique, for example by filtration. The solid product thus obtained may be dried, and then optionally resuspended in a liquid phase of the same type as that described above.

By dint of their properties and the nature of the substituents or dopants, the aluminates of the invention—by this is meant the aluminates in suspension form or the aluminates in solid form—may be used as phosphors.

More precisely, these aluminates have luminescence properties under electromagnetic excitation in the range of wavelengths used in plasma systems (displays and lamps, in which the excitation is created by a rare gas or a mixture of rare gases, such as xenon or/and neon), in mercury vapor lamps and in light-emitting diodes (LEDs). Thus, they may be used as phosphors in plasma systems (display or illumination system), in mercury vapor lamps and in LEDs.

The invention also relates to luminescent devices comprising the aluminate described above or as obtained by the process described above or manufactured using this same aluminate. Likewise, the invention relates to plasma systems, mercury vapor lamps or LEDs in the manufacture of which the aluminate may be used, or comprising this same aluminate. The processing of the phosphors in the manufacture of these products employs well-known techniques, for example screen printing, electrophoresis, sedimentation, inkjet printing, spraying, spin coating or dip coating.

The particle size properties of the aluminates of the invention mean that they can be used as markers in semitransparent inks, for example to produce an invisible barcode system of marking.

The aluminates of the invention may also be used as markers in a material of the paper, card, textile or glass type or else a macromolecular material. The latter may be of various types: elastomeric, thermoplastic, thermosetting.

Moreover, the particular properties of these aluminates, when they are undoped (no absorption in the visible and UV range), mean that they can be used as a reflective barrier in mercury vapor lighting systems.

The invention also relates to a luminescent material which comprises, or which can be manufactured from, at least one aluminate according to the invention or an aluminate obtained by the process as described above.

According to a preferred embodiment, this luminescent material may also be transparent. In this case, the aluminate involved in its composition or in its manufacture is an aluminate according to the invention with a mean size of between 100 nm and 200 nm, preferably between 100 nm and 150 nm.

It should be noted that this material may comprise, or be manufactured using, apart from the aluminate of the invention, other aluminates, or more generally other phosphors, in the form of submicron or nanoscale particles.

This material may be in two forms, i.e. either in a bulk form, the entire material having the transparency and luminescence properties, or in a composite form, i.e. in this case in the form of a substrate and a film on this substrate, the film alone then having these transparency and luminescence properties. In this case, the aluminate of the invention is contained in said film.

The substrate of the material is a substrate that may be made of silicon, based on a silicone, or made of quartz. The substrate may also be a glass or else a polymer, such as polycarbonate. The substrate, for example the polymer, may be in a rigid form or in a flexible form, such as a sheet or a plate a few millimeters in thickness. The substrate may also be in the form of a film substrate a few tens of microns, or even a few microns to a few tenths of a millimeter, in thickness.

The term "transparent material" is understood in the context of the invention to mean a material having a haze of at most 60% and a total transmission of at least 60% and preferably a haze of at most 40% and a total transmission of at least 80%. The total transmission corresponds to the total amount of light passing through the film relative to the amount of incident light. The haze corresponds to the ratio of the diffused transmission of the film to its total transmission.

These two quantities are measured under the following conditions: the film of material with a thickness between 0.2 μm and 1 μm is deposited on a standard glass substrate with a thickness of 0.5 mm. The weight fraction of aluminate particles in the material is at least 20%. The total transmission and diffuse transmission measurements are carried out through the film of material and through the substrate, by means of a conventional procedure using a Perkin Elmer Lamda 900 spectrometer fitted with an integration sphere, for a wavelength of 550 nm.

The material, and more particularly the aforementioned film, may comprise, apart from an aluminate according to the invention, binders or fillers of the polymer (polycarbonate or methacrylate), silicate, silica bead, phosphate or titanium oxide type, or other mineral fillers, in order in particular to improve the mechanical and optical properties of the material.

The weight fraction of aluminate particles in the material may be between 20% and 99%.

The thickness of the film may be between 30 nm and 10 μm, preferably between 100 nm and 3 μm and even more preferably between 100 nm and 1 μm.

The material in its composite form may be obtained by depositing an aluminate suspension of the invention on the substrate, said substrate having been optionally washed beforehand, for example using a sulfochromic mixture. It is also possible to add, during this deposition, the abovementioned binders or fillers. The deposition may be carried out using a spraying, spin coating or dip coating technique. After the film has been deposited, the substrate is dried in air and may optionally then undergo a heat treatment. The heat treatment is carried out by heating at a temperature generally of at least 200° C., but the maximum temperature being set in particular by taking into account the compatibility of the film with the substrate so as in particular to avoid undesirable reactions. The drying and the heat treatment may be carried out in air, in an inert atmosphere, under vacuum or else in hydrogen.

As mentioned above, the material may include binders or fillers. It is possible in this case to use suspensions which themselves include at least one of these binders or these fillers, or else precursors of said binders or fillers.

The material in the bulk form may be obtained by incorporating the aluminate particles into a matrix of the polymer type, for example a polymer such as polycarbonate, polymethacrylate or a silicone.

Finally, the invention relates to a luminescent system that comprises a material of the type described above and, in addition, an excitation source which may be a source of UV photons, such as a UV diode, or excitation of the Hg, rare gas or X-ray type.

The system may be used as a transparent wall lighting device, of the illuminating glazing type.

Examples will now be given.

EXAMPLE 1

This example relates to the preparation of a suspension of a barium magnesium aluminate according to the invention of formula $Ba_{0.9}Eu_{0.1}MgAl_{10}O_{17}$.

A solution was made up from a mixture of barium, magnesium and europium nitrates, with the following composition (in at %):
Ba: 45%
Mg: 50%
Eu: 5%.

A boehmite (265 m²/g specific surface area) sol was also prepared with an Al concentration of about 1.8 mol/l. The nitrate solution and the boehmite sol were mixed to obtain a gel having the following molar ratios:
Ba/Al: 0.09
Mg/Al: 0.1
Eu/Al: 0.01.

Water was added to this gel, to give an Al concentration of about 0.7 mol/l. The gel thus obtained had a final pH of 3.5. The gel was dried using a flash spray dryer as described above and in FR 2 431 321 A1, with an output temperature of 180° C. The dried powder was then calcined in air at 900° C. for two hours and then in an Ar/H$_2$ (95/5) mixture at 1400° C. for two hours.

The powder obtained was subjected to a wet grinding operation in a Netzch Labstar ball mill, with $ZrO_2$—$SiO_2$ balls of 0.4-0.8 mm diameter. The balls occupied 70% of the grinding chamber. The solids content of the suspension was 20 wt % and a dispersant, sodium hexametaphosphate (HMP), was added in an amount of 0.025 g of HMP/g of powder (i.e. 2.5 wt %). The mill was used in recirculation mode with a rotation speed of 3000 rpm. The grinding lasted 90 minutes.

Laser particle size analysis, without ultrasound, of the suspension obtained gave the following results:

| | |
|---|---|
| $d_{16}$ (nm) | 70 |
| $d_{50}$ (nm) | 138 |
| $d_{84}$ (nm) | 240 |
| σ/m | 0.6 |

As is apparent from FIG. 1, an X-ray diffraction analysis of the specimen obtained by drying the suspension at 100° C. in an oven shows a β-alumina phase with a coherent domain size calculated from the diffraction line corresponding to the [102] crystallographic plane of 101 nm.

It is found that the $d_{50}$ (laser) value and the size of the coherent (XRD) domain have the same order of magnitude, thereby confirming the single-crystal character of the particles.

Figure 2:
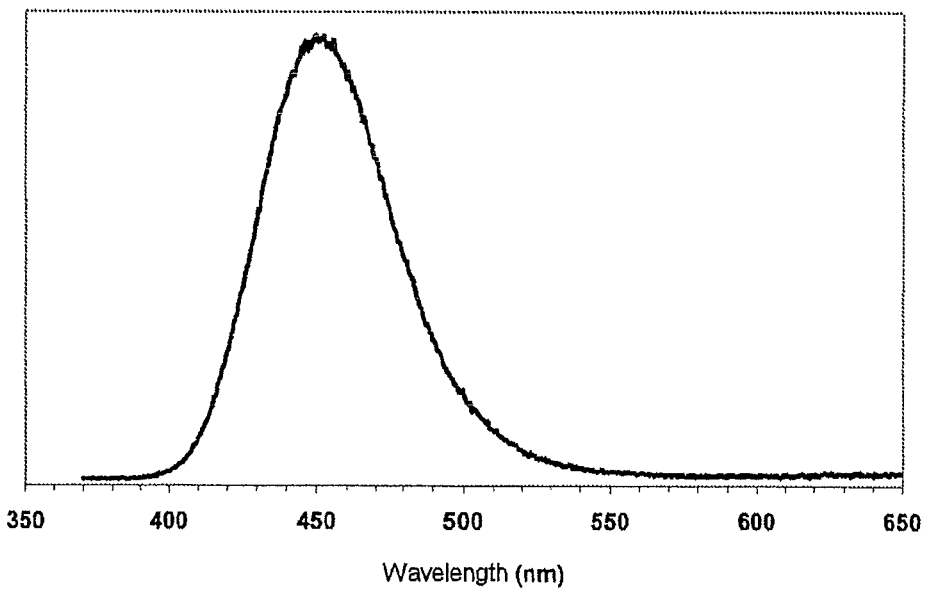
FIG. 2 is an emission spectrum of this same aluminate.

The suspension obtained emitted in the blue (450 nm) under excitation at 254 nm. FIG. 2 is the emission spectrum of this suspension.

EXAMPLE 2

This example relates to the preparation of a suspension of a barium magnesium aluminate according to the invention of formula $Ba_{0.9}Eu_{0.1}MgAl_{10}O_{17}$.

The preparation is identical to that of example 1 up to the point of the calcination at 1400° C.

The powder obtained was subjected to a wet grinding operation in a Molinex ball mill with $ZrO_2$—$SiO_2$ balls 0.4-0.6 mm in diameter. The balls occupied 65% of the grinding chamber. The solids content of the suspension was 20 wt % and a dispersant, sodium citrate, was added in an amount of 0.05 g of Na citrate/g of powder (i.e. 5 wt %). The rotation speed of the spindle was 1000 rpm. The grinding lasted 95 minutes.

Laser particle size analysis, without ultrasound, of the suspension obtained gave the following results:

| | |
|---|---|
| $d_{16}$ (nm) | 75 |
| $d_{50}$ (nm) | 158 |
| $d_{84}$ (nm) | 310 |
| σ/m | 0.75 |

X-ray diffraction analysis of the specimen obtained by drying the suspension at 100° C. in an oven shows a β-alumina phase with a coherent domain size calculated from the diffraction line corresponding to the [102] crystallographic plane of 119 nm.

Figure 3:
FIG. 3 is a TEM micrograph of a second suspension according to the invention.

It was found that the $d_{50}$ (laser) value and the coherent domain size were of the same order of magnitude, thereby confirming the single-crystal character of the particles. Moreover, FIG. 3 is a TEM micrograph of the suspension after the grinding, this micrograph showing the single-crystal character of the particles.

The suspension obtained emitted in the blue (450 nm) under excitation at 254 nm.

EXAMPLE 3

This example relates to the preparation of a suspension of a barium magnesium aluminate according to the invention of formula $Ba_{0.9}Eu_{0.1}MgAl_{10}O_{17}$.

The preparation is identical to that of example 1 up to the point of the calcination at 1400° C.

The powder obtained was subjected to a wet grinding operation in a Molinex ball mill with $ZrO_2$—$SiO_2$ balls 0.4-0.6 mm in diameter. The balls occupied 65% of the grinding chamber. The solids content of the suspension was 20 wt % and a dispersant, phosphosuccinic acid, was added in an amount of 0.09 g of phosphosuccinic acid/g of powder (i.e. 9 wt %). The rotation speed of the spindle was 1000 rpm. The grinding lasted 150 minutes.

Laser particle size analysis, without ultrasound, of the suspension obtained gave the following results:

| | |
|---|---|
| $d_{16}$ (nm) | 90 |
| $d_{50}$ (nm) | 227 |
| $d_{84}$ (nm) | 465 |
| σ/m | 0.8 |

Figure 4:
FIG. 4 is a TEM micrograph of a third suspension according to the invention.

FIG. 4 is a TEM micrograph of the suspension obtained from the grinding, which reveals the single-crystal character of the particles.

The suspension obtained emitted in the blue (450 nm) under excitation at 254 nm.

EXAMPLE 4

The procedure was carried out as in example 1 up to obtaining a gel having a final pH of 3.5. The gel was dried using an APV® spray dryer with an output temperature of 145° C. The dried powder was then calcined in air at 900° C. for two hours and then in an $Ar/H_2$ (95/5) mixture at 1400° C. for two hours.

The powder obtained was subjected to a wet grinding operation in a Molinex ball mill with $ZrO_2$—$SiO_2$ balls 1.6-2.5 mm in diameter. The balls occupied 65% of the grinding chamber. The solids content of the suspension was 50 wt % and a dispersant, sodium hexametaphosphate (HMP), was added in an amount of 0.05 g of HMP/g of powder (i.e. 5 wt %). The rotation speed of the spindle was 1800 rpm. The grinding lasted 240 minutes.

After this wet grinding operation, a second grinding operation was carried out on the suspension with $ZrO_2$—$SiO_2$ balls 0.2-0.3 mm in diameter for 45 minutes, without modifying the other grinding parameters.

Laser particle size analysis, without ultrasound, of the suspension obtained gave the following results:

| | |
|---|---|
| $d_{16}$ (nm) | 80 |
| $d_{50}$ (nm) | 145 |
| $d_{84}$ (nm) | 290 |
| σ/m | 0.7 |

X-ray diffraction analysis of the specimen obtained by drying the suspension at 100° C. in an oven revealed a β-alumina phase, with a coherent domain size calculated from the diffraction line corresponding to the [102] crystallographic plane of 100 nm.

It was found that the $d_{50}$ (laser) value and the coherent domain size were of the same order of magnitude, thereby confirming the single-crystal character of the particles.

The suspension obtained emitted in the blue (450 nm) under excitation at 254 nm.

EXAMPLE 5

This example relates to the preparation of a barium magnesium aluminate according to the invention of formula $Ba_{0.9}Eu_{0.1}Mg_{0.95}Mn_{0.05}Al_{10}O_{17}$.

A solution was made up from a mixture of barium, magnesium, europium and manganese nitrates having the following composition (in at %):

Ba: 45%
Mg: 47.5%
Eu: 5%
Mn: 2.5%.

A boehmite (265 $m^2/g$ specific surface area) sol was also prepared with an Al concentration of about 1.8 mol/l. The nitrate solution and the boehmite sol were mixed to obtain a gel having the following molar ratios:

Ba/Al: 0.09
Mg/Al: 0.095
Eu/Al: 0.01
Mn/Al: 0.005.

Water was added to this gel in order to obtain an Al concentration of about 0.7 mol/l. The gel thus obtained had a final pH of 3.5. The gel was dried using equipment identical to that of example 1 with an output temperature of 180° C. The dried powder was then calcined in air at 900° C. for two hours and then in an $Ar/H_2$ (95/5) mixture at 1400° C. for two hours.

The powder obtained was subjected to a wet grinding operation in a Molinex ball mill with $ZrO_2$—$SiO_2$ balls of 1.6-2.5 mm diameter. The balls occupied 65% of the grinding chamber. The solids content of the suspension was 50 wt % and a dispersant, sodium hexametaphosphate (HMP), was added in an amount of 0.075 g of HMP/g of powder (i.e. 7.5 wt %). The rotation speed of the spindle was 1800 rpm. The grinding lasted 360 minutes.

After this wet grinding operation, a second grinding operation was carried out on the suspension with $ZrO_2$—$SiO_2$ balls 0.2-0.3 mm in diameter. The other parameters of the grinding were unchanged, and the grinding time was 215 minutes.

Laser particle size analysis, without ultrasound, of the suspension obtained gave the following results:

| | |
|---|---|
| $d_{16}$ (nm) | 90 |
| $d_{50}$ (nm) | 166 |
| $d_{84}$ (nm) | 360 |
| σ/m | 0.8 |

X-ray diffraction analysis of the specimen obtained by drying the suspension at 100° C. in an oven shows a β-alumina phase with a coherent domain size calculated from the diffraction line corresponding to the [102] crystallographic plane of 110 nm.

It was found that the $d_{50}$ (laser) value and the coherent domain size were of the same order of magnitude, thereby confirming the single-crystal character of the particles.

Figure 5:
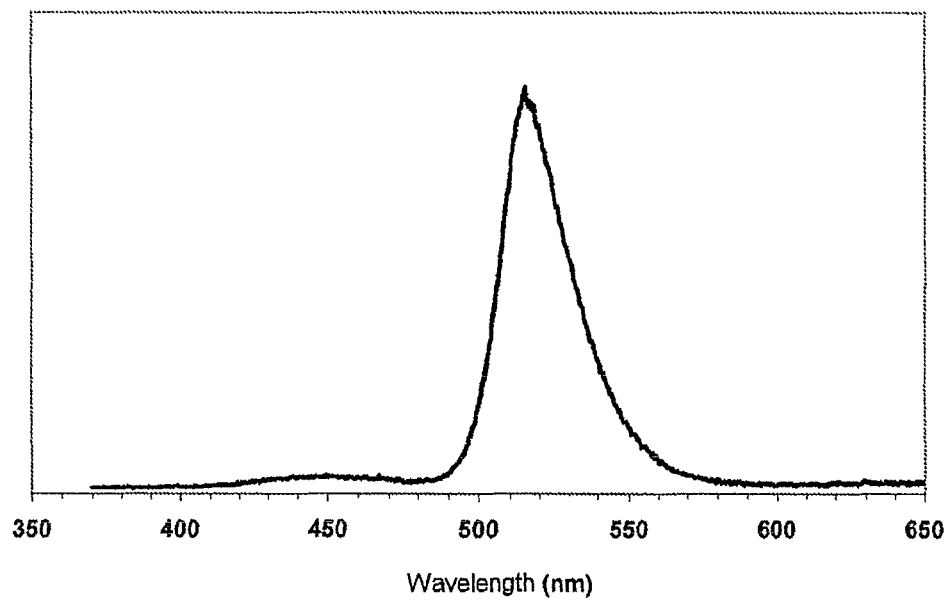
FIG. 5 is an emission spectrum of a fourth aluminate according to the invention.

The product obtained emitted in the blue (450 nm) and in the green (515 nm) under excitation at 254 nm. FIG. 5 is the emission spectrum of this suspension.

EXAMPLE 6

This example relates to the preparation of a suspension of a barium magnesium aluminate according to the invention of formula $Ba_{0.9}Eu_{0.1}Mg_{0.6}Mn_{0.4}Al_{10}O_{17}$.

A solution was made up from a mixture of barium, magnesium, europium and manganese nitrates having the following composition (in at %):

Ba: 45%
Mg: 30%
Eu: 5%
Mn: 20%.

A boehmite (265 m²/g specific surface area) sol was also prepared with an Al concentration of about 1.8 mol/l. The nitrate solution and the boehmite sol were mixed to obtain a gel having the following molar ratios:
Ba/Al: 0.09
Mg/Al: 0.06
Eu/Al: 0.01
Mn/Al: 0.04.

Water was added to this gel in order to obtain an Al concentration of about 0.7 mol/l. The gel thus obtained had a final pH of 3.5. The gel was dried using equipment identical to that of example 1 with an output temperature of 180° C. The dried powder was then calcined in air at 900° C. for two hours and then in an Ar/$H_2$ (95/5) mixture at 1400° C. for two hours.

The powder obtained was subjected to a wet grinding operation in a Molinex ball mill with $ZrO_2$—$SiO_2$ balls of 1.6-2.5 mm diameter. The balls occupied 65% of the grinding chamber. The solids content of the suspension was 50 wt % and a dispersant, sodium hexametaphosphate (HMP), was added in an amount of 0.075 g of HMP/g of powder (i.e. 7.5 wt %). The rotation speed of the spindle was 1800 rpm. The grinding lasted 420 minutes.

After this wet grinding operation, a second grinding operation was carried out on the suspension with $ZrO_2$—$SiO_2$ balls 0.2-0.3 mm in diameter. The other parameters of the grinding were unchanged, and the grinding time was 200 minutes.

Laser particle size analysis, without ultrasound, of the suspension obtained gave the following results:

| | |
|---|---|
| $d_{16}$ (nm) | 80 |
| $d_{50}$ (nm) | 160 |
| $d_{84}$ (nm) | 340 |
| σ/m | 0.8 |

X-ray diffraction analysis of the specimen obtained by drying the suspension at 100° C. in an oven shows a β-alumina phase with a coherent domain size calculated from the diffraction line corresponding to the [102] crystallographic plane of 89 nm.

It was found that the $d_{50}$ (laser) value and the coherent domain size were of the same order of magnitude, thereby confirming the single-crystal character of the particles.

Figure 6:
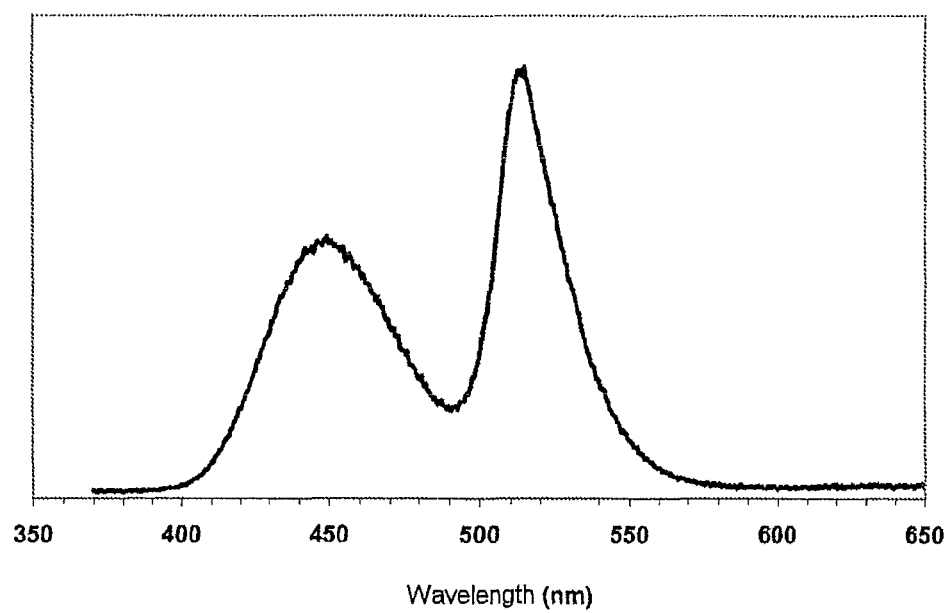
FIG. 6 is an emission spectrum of a fifth aluminate according to the invention.

The product obtained emitted in the blue (450 nm) and in the green (515 nm) under excitation at 254 nm. FIG. 6 is the emission spectrum of this suspension.

The invention claimed is:

1. A stable suspension of barium magnesium aluminate, wherein the suspension comprises substantially single-crystal particles having a mean size of 80 nm to 200 nm, essentially devoid of particle agglomerates, and dispersed in a liquid phase, the suspension having a concentration of solids of 10 g/l to 500 g/l, and the liquid phase including a dispersant in an amount of 1% to 15% by weight of the dispersant relative to the weight of solids in the dispersion.

2. The suspension as defined by claim 1, the particles having a mean size of 100 nm to 200 nm.

3. The suspension as defined by claim 1, the particles having a distribution index of at most 0.7.

4. The suspension as defined by claim 1, crystallized in the form of a pure β-alumina phase.

5. The suspension as defined by claim 1, the particles thereof having the formula (I): $a(Ba_{1-d}M^1_dO).b(Mg_{1-e}M^2_eO).c(Al_2O_3)$ in which $M^1$ is a rare earth selected from the group consisting of gadolinium, terbium, yttrium, ytterbium, europium, neodymium and dysprosium; $M^2$ is zinc, manganese or cobalt; and a, b, c, d and e are such as to satisfy the relationships: $0.25 \leq a \leq 2$; $0 < b \leq 2$; $3 \leq c \leq 9$; $0 \leq d \leq 0.4$ and $0 \leq e < 0.6$.

6. The suspension as defined by claim 5, wherein formula (I) a=b=1 and c=5; or a=b=1 and c=7 or else a=1; b=2 and c=8.

7. A process for producing the suspension as defined by claim 1, comprising:
providing a liquid mixture comprising aluminum compounds and compounds of other elements in the composition of the aluminate;
spray-drying said mixture;
calcining the dried product; and
wet grinding the product produced after the calcination.

8. The process as defined by claim 7, wherein the aluminum compound comprises a sol thereof.

9. The process as defined by claim 7, wherein nitrates comprise the aluminum compounds and the compounds of the other elements.

10. The suspension as defined by claim 1, the aluminate particles having one of the formulae selected from the group consisting of $BaMgAl_{10}O_{17}$; $Ba_{0.9}Eu_{0.1}MgAl_{10}O_{17}$; $Ba_{0.9}Eu_{0.1}Mg_{0.6}Mn_{0.4}Al_{10}O_{17}$; $Ba_{0.9}Eu_{0.1}Mg_{0.8}Mn_{0.2}Al_{10}O_{17}$; $Ba_{0.9}Eu_{0.1}Mg_{0.95}Mn_{0.05}Al_{10}O_{17}$; $BaMgAl_{14}O_{23}$; $Ba_{0.9}Eu_{0.1}MgAl_{14}O_{23}$ and $Ba_{0.8}Eu_{0.2}Mg_{1.93}Mn_{0.07}Al_{16}O_{27}$.

11. The suspension as defined by claim 1, wherein the particles have a ratio of laser scattering measured mean size to x-ray diffraction measured crystal size of less than 2.

12. The suspension as defined by claim 11, wherein the ratio is at most 1.5.

13. The suspension as defined by claim 1, wherein the concentration of solids is 40 g/l to 300 g/l.

14. The suspension as defined by claim 1, wherein the amount of dispersant is 4% to 8%.

* * * * *

UNITED STATES PATENT AND TRADEMARK OFFICE
CERTIFICATE OF CORRECTION

| | | |
|---|---|---|
| PATENT NO. | : 8,580,150 B2 | Page 1 of 1 |
| APPLICATION NO. | : 12/933133 | |
| DATED | : November 12, 2013 | |
| INVENTOR(S) | : Valérie Buissette et al. | |

It is certified that error appears in the above-identified patent and that said Letters Patent is hereby corrected as shown below:

On the Title Page, Item (86), please replace the 371 date "Feb. 8, 2010" with the date --December 8, 2010--

Signed and Sealed this
Twenty-seventh Day of October, 2015

Michelle K. Lee
*Director of the United States Patent and Trademark Office*